United States Patent [19]

Heffley et al.

[11] 4,206,174
[45] Jun. 3, 1980

[54] MEANS FOR SEPARATING SUSPENSIONS OF GASIFORM MATERIAL AND FLUIDIZABLE PARTICLES

[75] Inventors: Scott A. Heffley, Bolingbrook, Ill.; Klaus W. Schatz, Wenonah, N.J.

[73] Assignee: Mobil Oil Corporation, New York, N.Y.

[21] Appl. No.: 926,988

[22] Filed: Jul. 21, 1978

Related U.S. Application Data

[62] Division of Ser. No. 874,263, Feb. 1, 1978.

[51] Int. Cl.² ............................................. B01J 8/00
[52] U.S. Cl. ................................... 422/144; 422/145; 422/147; 422/214
[58] Field of Search ............... 422/144, 145, 147, 213, 422/214; 55/457, 448, 263, DIG. 30

[56] References Cited

U.S. PATENT DOCUMENTS

| | | | |
|---|---|---|---|
| 1,923,498 | 8/1933 | Nallinger | 55/457 |
| 2,491,099 | 12/1949 | Fisher | 422/145 |
| 3,751,886 | 8/1973 | Sokolowski | 55/457 |
| 3,893,812 | 7/1975 | Conner et al. | 422/145 |
| 4,097,243 | 6/1978 | Bartholic | 422/145 |

FOREIGN PATENT DOCUMENTS

| | | | |
|---|---|---|---|
| 1038479 | 9/1953 | France | 55/457 |
| 1320200 | 10/1963 | France | 55/457 |
| 1222458 | 2/1971 | United Kingdom | 55/263 |

*Primary Examiner*—Joseph Scovronek
*Assistant Examiner*—Chris Konkol
*Attorney, Agent, or Firm*—Charles A. Huggett; Carl D. Farnsworth

[57] ABSTRACT

In a reactant-fluid catalyst suspension system, an arrangement of apparatus is provided contiguous with a riser discharge which centrifugally initially separates the suspension into a solids phase and a gasiform material phase prior to discharge from the riser. The catalyst may be further stripped if desired in equipment above and about the riser discharge. The arrangement contributes substantially to the efficiency and economics of the separation of catalyst from gasiform products including products of hydrocarbon conversion and combustion products of catalyst regeneration.

2 Claims, 2 Drawing Figures

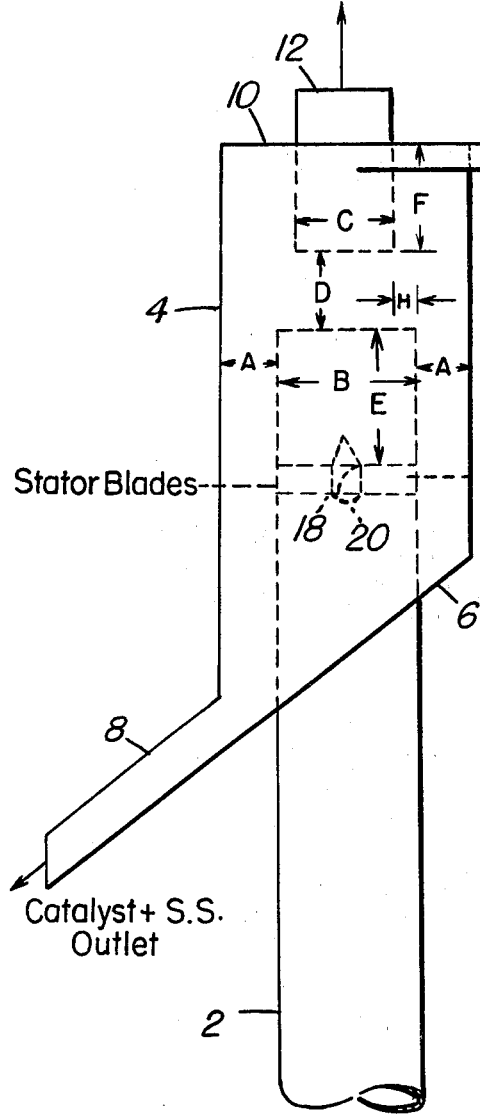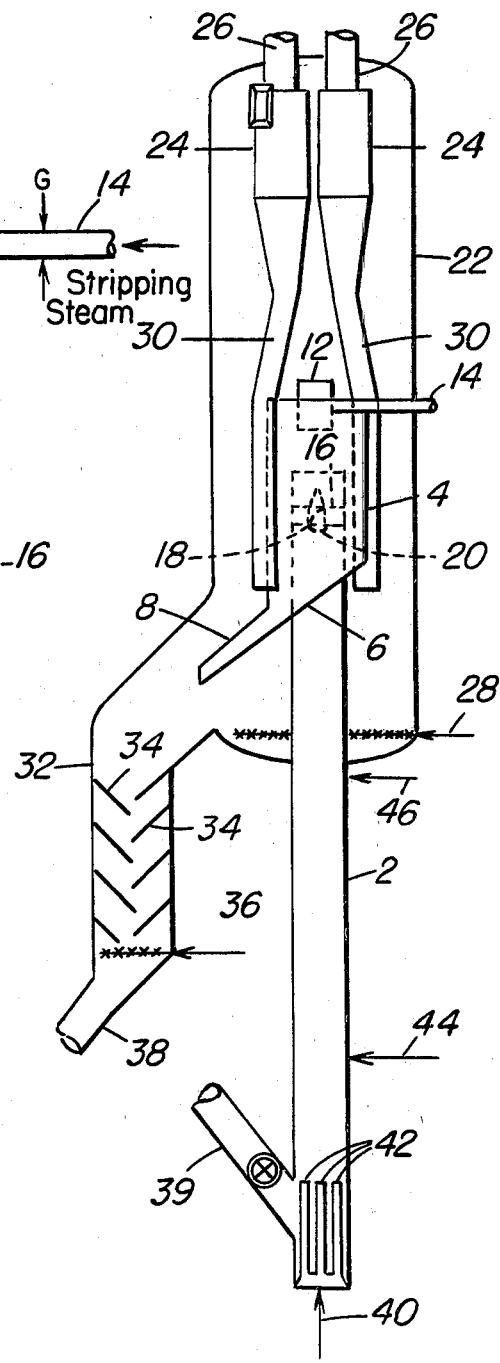

MEANS FOR SEPARATING SUSPENSIONS OF GASIFORM MATERIAL AND FLUIDIZABLE PARTICLES

CROSS REFERENCE TO RELATED APPLICATIONS

This is a division of application Ser. No. 874,263 filed Feb. 1, 1978.

BACKGROUND OF THE INVENTION

This invention is concerned with a special method and means for separating solids-gasiform material suspensions formed in fluidized solids contact systems. It is particularly concerned with an arrangement of apparatus and the method of using for effecting an efficient separation of fluid catalyst from hydrocarbon vapors or combustion product gases immediately adjacent to the discharge of a riser contact zone.

In cyclone separators normally employed, a suspension comprising a gasiform material with entrained finely divided solid particle material is introduced horizontally into the separator in a tangential manner so as to impart a spiral or centrifugal and swirling moment to the suspension. This centrifugal moment causes the solids to be thrown to the outer wall of the cyclone separator for movement downward to a collecting zone or hopper therebelow. The gasiform material centrifugally separated from solids is removed by a central open ended passageway extending from a plane beneath the suspension tangential inlet upwardly through the top of the cyclone separator. A reduced pressure exists on this gasiform material withdrawal passageway. A particularly useful application of the centrifugal separator is in connection with reactions employing fluidizable catalyst particles such as the catalytic treatment of petroleum fractions by cracking, the regeneration of catalyst in upflowing riser type systems, the synthesis of hydrocarbons from CO and $H_2$, the conversion of methanol and related low boiling alcohols to liquid hydrocarbons and other well-known prior art fluid catalyst operations.

In modern-day refinery operations employing fluid catalyst cracking operations, enormous amounts of catalyst suspended in a reactant material are handled in a riser conversion zone and an upflowing catalyst regeneration zone. It is necessary to rapidly separate the suspensions into a catalyst phase and a gasiform product phase following a desired contact time within the riser contact zone to obtain desired gasiform product material. The present invention is concerned with an arrangement of apparatus particularly suitable for effecting this separation of the suspension in an efficient manner but also in an arrangement of equipment of smaller dimensions contributing significantly to the economics of the system.

SUMMARY OF THE INVENTION

The present invention is concerned with an arrangement of apparatus and method of operation for separating a suspension of gasiform material and finely divided solid particle material. More particularly, the present invention is concerned with the method and means for separating a suspension of regenerated catalyst from combustion product gases or a hydrocarbon conversion product of catalytic cracking from catalyst particles very rapidly after a selected hydrocarbon residence time in a riser reaction zone so that over-cracking of the reaction product can be minimized and the catalyst exposure to deactivating product material substantially reduced.

The present invention is concerned with reducing the equipment inventory and size thereof for effecting the separation of a suspension of finely divided solid fluidizable particle material from gasiform material. In yet another aspect, the present invention is concerned with minimizing catalyst particle hold-up in an arrangement of reaction apparatus so that the overall catalyst inventory of the system may be kept at a desired low level.

The present invention is particularly concerned with obtaining a rapid separation of a suspension comprising fluidized catalyst particles and reaction product material following traverse of a riser reaction zone permitting relatively short contact time hydrocarbon conversion for a time period less than about 10 seconds and more usually less than about 5 seconds. The present invention is particularly useful for separating reaction suspensions completed in a time span of about 2–3 seconds or less. It has been found that present day cyclonic separating equipment arrangements are less adequate than desired since they have been found to contribute to overcracking due to catalyst hydrocarbon residence time therein and a loss in desired product amounting up to about 3 percent. Thus, a gasoline loss due to overcracking in cyclone separators can be up to about 1.5 volume percent based on fresh feed.

The method and means of this invention are particularly suitable for use with high activity crystalline zeolite conversion catalyst wherein it is desired to particularly restrict the catalyst-hydrocarbon contact time, the catalyst inventory, minimize the formation of coke and maximize the yield of desired product. Thus, it is contemplated effecting the conversion of gas oil to gasoline boiling product with a highly active crystalline zeolite conversion catalyst employing a reaction temperature within the range of about 950° F. to about 1050° F. and a hydrocarbon residence time in contact with suspended catalyst particles restricted to within the range of 0.5 to about 3 seconds. In such an operation, it is preferred that the catalyst hydrocarbon suspension pass through the riser essentially in plug flow arrangement so that the catalyst residence time in the riser reaction is not substantially longer than the hydrocarbon residence time. However, it is contemplated operating with a catalyst slip factor as high as about 0.5, where slip factor is defined as the ratio of hydrocarbon residence time to catalyst residence time.

In the arrangement of apparatus of this invention, stator means comprising fixedly positioned curved blades positioned below the riser discharge induce a centrifugal motion to the rising suspension sufficient to cast solid particles to the riser wall before discharge therefrom. The solids thus rejected from reactant product gasiform material are substantially immediately subjected to centrifugal co-current contact with stripping steam in a chamber of restricted dimensions about the riser discharge which collects the stripped catalyst at its walls for flow downwardly to withdrawal means in a manner similar to that of the normal cyclone separator. Separated reactant product and steam pass through an open passageway of smaller diameter than said riser diameter and coaxially aligned therewith, extending through the upper surface of the chamber of restricted dimensions. The apparatus above briefly described is housed within a second vessel of restricted diameter and comprising cyclone separators in an upper portion thereof with means for stripping catalyst therebelow.

DISCUSSION OF SPECIFIC EMBODIMENTS

FIG. I is a diagrammatic sketch in elevation of the discharge end of the riser showing the arrangement of stator blades and the catalyst stripping means about the discharge end of the riser.

FIG. II is a diagrammatic sketch in elevation of a fluid catalyst cracking system comprising the riser separator means of FIG. I within a vessel of reduced diameter comprising cyclone separator means in a top portion means for stripping separated catalyst and multiple injection feed means at the bottom of the riser.

Referring now to FIG. I by way of example, the upper discharge end of a riser reactor 2 is shown. The open discharge end of the riser is housed coaxially within a larger diameter vessel 4 and provides an annular space "A" between the cylindrical wall of vessel 4 and the wall of riser conduit 2. Vessel 4 is provided with a sloping bottom 6 to which a catalyst withdrawal conduit 8 is provided adjacent thereto. The top of vessel 4 is closed by member 10 and provided with a gasiform material withdrawal conduit 12 coaxially positioned within vessel 4 and with riser 2. Conduit 12 of diameter "C" is smaller in diameter than riser 2 of diameter "B" by an annular distance H. In addition, the top open end of riser 2 is spaced apart from the bottom open end of conduit 12 by distance "D." A stripping gas is introduced tangentially into vessel 4 adjacent the top surface 10 thereof by conduit 14 of diameter "G." The bottom open end of conduit 12 is spaced from the top surface 10 of vessel 4 by a distance "F." Positioned within an upper portion of riser conduit 2 and below the open upper end thereof by a distance E is positioned an arrangement of fixed curved stator blades 16 about a closed conduit 18 comprising a conical top portion with a hemispherical shaped bottom 20. In the arrangement of the figure, there are two or more, such as four, curved stator blades 16 in a specific arrangement which are fixedly positioned and function in the manner herein discussed. The number employed will be a function of the suspension throughput and diameter of the riser.

The design relationship of the separator means above briefly described contemplates in a specific embodiment of using an annular cross-section of dimension A which is twice that of the cross-section area of the riser conduit and comprising dimension B. Diameter B is larger than diameter C of the gas outlet conduit 12 by a factor of 1.5 and it may be within the range of (1.2 to 1.7). Diameter B is preferably 1.8 times the height D but it may be within the range of about (1.5 to 2.0). Height E is preferably 1.4 times the diameter B but it may be within the range of about (1 to 2). Height F is preferably 4 times the diameter "G" of pipe 14. In operation, it is preferred to employ a stripping steam flow rate equivalent to 2 pounds of steam per thousand pounds of catalyst to achieve rapid separation of hydrocarbon product from physically separated catalyst particles. However, the steam flow rate may vary within the range of 1 to 3 pounds of steam per thousand pounds of catalyst.

In operation, a suspension of hydrocarbon vapors and catalyst particles passed upwardly through riser conduit 2 is caused to rotate by fixed curved stator blades 16, thereby throwing the catalyst by centrifugal action to the wall of the riser above the blades so that the catalyst will pass into vessel 4 through annular space "H". Stripping steam introduced co-currently by conduit 14 further promotes the centrifugal separation of hydrocarbon vapors from catalyst particles by displacement and the stripping action of the tangentially introduced steam. The stripped and separated hydrocarbon vapors enter the bottom of open ended withdrawal conduit 12 for passage through additional centrifugal separators before passage to fractionation equipment not shown. The catalyst thus separated flows down the walls of vessel 4 for withdrawal therefrom by conduit 8 and passage to a second stripping operation as particularly discussed with respect to FIG. II.

Referring now to FIG. II, there is shown a riser reactor with the separator arrangement of FIG. I comprising a catalyst collecting vessel in open communication with a stripping vessel, and conduit means to complete the catalyst circulation between a catalyst regenerator not shown and the riser hydrocarbon conversion means.

The riser reactor 2 with separator arrangement attached as shown and discussed with respect to FIG. I is housed in a larger vessel 22 of restricted diameter and provided with cyclone separator means 24 in the upper portion of the vessel and above chamber means 4. It is contemplated employing a plurality of cyclone separator 24 in the upper portion of vessel 22 and comprising a plurality of pairs of at least 2 in sequential arrangement. Hydrocarbon conversion products and stripping gas are recovered from cyclones 24 by conduit 26 communicating with a common header pipe not shown and in open communication with a downstream fractionation zone not shown. Conduit means 28 are provided in the bottom portion of vessel 22 for introducing fluidizing or stripping gas to the bottom portion of collected catalyst particles discharged from conduit 8 and from cyclone diplegs 30. The bottom portion of vessel 22 may be arranged as a restricted annular catalyst stripping zone with a downwardly sloping bottom communicating with a catalyst withdrawal standpipe, thus excluding stripping zone 32 shown in the drawing. A separate zone or chamber 32 may be provided, however, as shown in the figure. On the other hand, vessel 22 comprising a sloping bottom may pass catalyst directly to external stripper 132. Stripping chamber 32 is provided with a plurality of downwardly sloping baffles 34 which may be disc and donut arranged baffles over which the catalyst passes counter-current to upflowing stripping gas introduced by conduit 36 to a lower portion of the stripping chamber. Stripped catalyst is withdrawn by conduit 38 for passage to catalyst regeneration.

The hydrocarbon conversion system comprising riser 2 and related downstream equipment is arranged to effect the catalytic upgrading of hydrocarbons charged thereto. For example, low quality naphthas may be catalytically improved in quality and octane rating by a selective conversion thereof in the presence of a suitable crystalline zeolite hydrocarbon conversion catalyst. In addition, high boiling hydrocarbons comprising atmospheric and vacuum gas oils, residual oils and cycle oil products of cracking may also be converted to desired product under particularly selected operating severity conditions. Thus, it is contemplated maximizing the conversion of gas oils to gasoline by employing selected high temperature cracking conditions restricting the hydrocarbon contact time with the catalyst within the range of 0.5 to 4 seconds and more usually not more than about 2 or 3 seconds. The hydrocarbon reactant may be charged to the bottom of the riser reaction zone by conduit 40 communicating with a multiple feed nozzle inlet means 42 for admixture with hot regenerated catalyst at a temperature of at least 1300° F. and more usually at least about 1350° F. in conduit 39. A high temperature catalyst oil suspension thus formed is caused to flow substantially in plug flow arrangement through the riser under sufficiently high velocity conditions contributing particularly to the yield of desired gasoline or light fuel oil product. The high temperature conversion of the gas oil feed may be substantially, if not completely, reduced by the addition of a different boiling range hydrocarbon of reduced temperature to the suspension in one or more downstream portions of the riser as by conduits 44 and 46. On the other hand, a suspension forming vaporous material lighter than gas oil, such as low quality naphtha and/or lighter hydrocarbon material comprising $C_5$ and lighter hydrocarbons may initially contact the freshly regenerated catalyst before contacting a gas oil feed charged to a downstream portion of the riser by conduits 44 or 46 for conversion to gasoline or a light fuel oil product. In any of the hydrocarbon conversion operations above discussed, it is contemplated employing a riser reactor 2 of the same diameter throughout its vertical height or the riser may be of restricted diameter in a lower portion to particularly promote a plug flow high velocity hydrocarbon conversion operation of selected duration followed by conversion of a higher boiling feed, a cycle oil product of cracking, a residual oil or additional gas oil feed may be charged in an expanded larger diameter downstream portion of the riser reactor conduit.

During conversion of hydrocarbons, the catalyst as employed accumulates products of conversion including hydrocarbonaceous material and coke. Catalysts used to convert hydrocarbons and known in the prior art include amorphous and crystalline silica-alumina catalyst and mixtures thereof. For example, the catalyst may be a mixture of small and large pore crystalline zeolite. Generally, such crystalline zeolite catalysts are lower coke producers than the amorphous cracking catalysts and may be more effectively used at high temperature under very short catalyst/hydrocarbon contact times of less than about 8 seconds. The crystalline silica-alumina catalyst may be a faujasite crystalline zeolite such as "Y" faujasite, a mordenite type of zeolite or mixtures of the same. In addition, it is contemplated employing with either of these zeolites, a special class of crystalline zeolites represented by ZSM-5 crystalline zeolites and characterized by a pore opening of at least 5 Angstroms, a silica-alumina ratio of at least 12 and a constraint index within the range of 1 to 12. In modern refinery operations whether one uses a single or dual component cracking catalyst such as a mixture of faujasite with either amorphous silica/alumina, mordenite or ZSM-5 crystalline zeolite, it is desirable to include a CO oxidation promoter. Crystalline zeolite cracking catalysts are generally known as low coke producers and the presence of the CO oxidation promoter helps to increase the recovery of heat by the catalyst during combustion of coke and CO in a catalyst regeneration zone not shown.

Some metal components suitable for promoting the combustion of carbon monoxide disclosed in the prior art include copper, nickel, chromium, manganese oxide or copper chromite. Some recently issued applications to this subject of CO combustion include Ser. Nos. 649,261, filed Jan. 15, 1976, and 703,862, filed July 4, 1976. The subject matter of these applications is incorporated herein by reference thereto. U.S. patents of interest to the concepts of this invention and having a bearing on techniques for regenerating cracking catalysts are U.S. Pat. Nos. 4,035,284, issued July 12, 1977; 3,893,812, issued July 8, 1977; and 3,926,778, issued Dec. 16, 1975.

The riser reactor, suspension separator and stripping arrangement of FIG. II may be used with substantially any catalyst regenerator arrangement known in the prior art. For example, the regenerator may comprise a dense fluid bed of catalyst superimposed by a more dispersed catalyst phase in which arrangement the burning of carbonaceous material is promoted in at least the dense fluid bed of catalyst and the burning of carbon monoxide is promoted in either one or both of the dense and dispersed catalyst phases. In such an arrangement, it is desirable to maximize the recovery of heat generated particularly when using low coke producing crystalline zeolites as the catalyst. Thus, the recovery of heat from the dispersed phase of catalyst may be promoted by introducing at least partially regenerated catalyst into the dispersed phase as a separate stream of catalyst and/or by increasing the flow rate of regeneration gas to the fluid bed so as to expand it, carry more catalyst into the dispersed catalyst phase, and remove a distinct demarkation between the dense catalyst phase and the dispersed catalyst phase. The bed of catalyst in such an arrangement may be caused to circulate by introducing spent catalyst tangentially to the dense fluid catalyst bed adjacent its upper interface or to a lower portion of the bed. It is contemplated effecting regeneration of the catalyst in a regenerator configurations, as represented by U.S. Pat. No. 4,035,284, which permit the recovery of regenerated catalyst from the dispersed catalyst phase, from upper and lower portions of the more dense phase of catalyst and for mixing regenerated catalyst particles with spent catalyst particles to form a mixture thereof at an elevated temperature of at least 1100° F. and preferably at least 1175° F. so that upon contact with oxygen containing regeneration gas, rapid ignition and burning of carbonaceous material will be accomplished. This mixing of spent and regenerated catalyst particles may be accomplished within the dense fluid bed of catalyst, in a riser mixing zone discharging into the dense fluid bed of catalyst or into the more dispersed catalyst phase above a dense fluid bed of catalyst being regenerated.

When adapting the suspension separation arrangement of FIG. I to the upper end of a riser catalyst regeneration zone such as shown in the patents above-identified and particularly about the upper end of riser 8 of U.S. Pat. No. 3,926,778, it is contemplated providing cylindrical vessel 4 with a bottom open end to provide an annular catalyst discharge zone about the riser. In addition, vessel 4 may be extended downwardly about the riser 8 portion of the regenerator so that the collected bed of regenerated catalyst will be relatively shallow above the catalyst withdrawal standpipes of the regeneration zone. Thus, it is clear that the suspension separation method and means herein discussed is applicable for separating a suspension of regenerated catalyst from combustion product gases as well as for separating a suspension of hydrocarbon conversion particularly discussed above.

In yet another embodiment, it is contemplated using flue gas rather than steam introduced by conduit 14 to facilitate the separation of regenerated catalyst from combustion product gases. On the other hand, it has been found that no additional gaseous material need be added as by conduit 14 in order to obtain a satisfactory separation of the suspension. This is particularly true when using the arrangement for separating a suspension of hot regenerated catalyst from combustion product gases. Stripping of the regenerated catalyst may be accomplished before withdrawal by standpipes or in a special section of the withdrawal standpipe.

Having thus generally described the means and method of using in accordance with this invention and described specific embodiments thereof, it is to be understood that no undue restrictions are to be imposed by reason thereof except as defined by the following claims.

We claim:

1. Apparatus for contacting a reactant material with finely divided solid particles in a suspension and separating the suspension into a gasiform product stream separate from said particles which comprises,
    an upwardly extending riser conduit means open at its upper end, means for separately charging finely divided solid particles and reactant material to a bottom portion of said riser conduit to form an upflowing suspension,
    stator separating means within and adjacent the upper open end of said riser conduit means comprising an annular space in said riser provided with a plurality of spaced apart sloping baffle means,
    the upper end of said riser terminating in a first larger diameter closed cylindrical vessel provided with a sloping bottom means for withdrawing particles of separated solids from the bottom of said closed cylindrical vessel, open ended conduit means coaxially aligned with said riser conduit but of smaller diameter extending through an upper surface of said closed cylindrical vessel and spaced upwardly apart from the riser upper open end, and conduit means for charging gaseous material tangentially into the upper portion of said first larger diameter cylindrical vessel and about said smaller diameter open ended conduit means.

2. An apparatus combination comprising,
    a large diameter elongated vessel chamber, a smaller diameter chamber within an intermediate portion of said large diameter vessel chamber, a riser conduit open in its upper end extending upwardly through said large diameter vessel chamber and terminating coaxially within an intermediate portion of said smaller diameter chamber, said riser conduit being of smaller diameter than said smaller diameter chamber, open ended conduit means of smaller diameter than said riser conduit coaxially positioned within the upper closed surface of said smaller diameter chamber, said open ended conduit vertically spaced above and apart from the upper open end of said riser conduit, conduit means tangentially communicating with the upper inner portion of said smaller diameter chamber for charging gaseous material about the lower portion of said open ended conduit,
    stator means within and beneath the upper open end of said riser conduit comprising an annular space with the riser wall and provided with a plurality of horizontally spaced apart sloping baffle means arranged to provide centrifugal motion to a gasiform material—fluid solid particle suspension passed therethrough,
    cyclonic separating means positioned in an upper portion of said large diameter vessel above said smaller diameter chamber and in open communication with the smaller diameter chamber through said open ended conduit, means for passing solids from said smaller diameter chamber to said larger diameter chamber for admixture with solids separated by said cyclonic means, and
    means for withdrawing solids separated in said apparatus combination from a bottom portion of said large diameter vessel chamber.

* * * * *